(12) United States Patent
Mitamura et al.

(10) Patent No.: US 6,171,414 B1
(45) Date of Patent: Jan. 9, 2001

(54) ROLLING BEARING

(75) Inventors: Nobuaki Mitamura; Kazuo Sekino, both of Kanagawa; Takaaki Koike, Tokyo; Yukio Takahashi, Chiba; Mikio Yamaguchi, Kanagawa, all of (JP)

(73) Assignees: NSK Ltd.; Ishikawajima-Harima Heavy Industries Co., Ltd., both of Tokyo (JP)

( * ) Notice: Under 35 U.S.C. 154(b), the term of this patent shall be extended for 0 days.

(21) Appl. No.: 09/098,980

(22) Filed: Jun. 17, 1998

(30) Foreign Application Priority Data

Jun. 17, 1997 (JP) .................................................. 9-175175

(51) Int. Cl.⁷ ............................. C22C 38/18; F16C 33/00
(52) U.S. Cl. ......................... 148/333; 148/334; 384/492; 384/527; 384/912
(58) Field of Search ..................................... 148/333, 334; 384/492, 527, 912

(56) References Cited

U.S. PATENT DOCUMENTS

| | | |
|---|---|---|
| 4,963,040 | 10/1990 | Takebayashi et al. . |
| 5,137,375 | 8/1992 | Murakami et al. . |
| 5,338,377 | 8/1994 | Mitamura et al. . |

FOREIGN PATENT DOCUMENTS

| | | | |
|---|---|---|---|
| 0320951A1 | 6/1989 | (EP) | ............................. F16C/33/30 |
| 2 235 698 | 3/1991 | (GB) . | |
| 2258274 | 2/1993 | (GB) | ............................. F16C/33/30 |
| 2 278 613 | 12/1994 | (GB) . | |
| 2 292 389 | 2/1996 | (GB) . | |
| 2 293 214 | 3/1996 | (GB) . | |
| 2 294 058 | 4/1996 | (GB) . | |
| 2 314 344 | 12/1997 | (GB) . | |

OTHER PUBLICATIONS

Der Konstruckteur ASB/96, Seite 104 (with English translation). 1996.

*Primary Examiner*—Sikyin Ip
(74) *Attorney, Agent, or Firm*—Sughrue, Mion, Zinn, Macpeak & Seas, PLLC

(57) ABSTRACT

A rolling bearing comprises races including an inner race and an outer race formed of an alloy steel material; and a plurality of rolling elements formed of a ceramic material and interposed between the inner race and the outer race in such a manner as to be capable of rolling, wherein at least one of the inner race and the outer race is formed of an alloy steel containing 0.7–1.5 wt. % Si, 0.5–2.0 wt. % Cr, and 0.5–2.0 wt. % Mo in a steel, and is subjected to carbonitriding treatment on the surface of the alloy steel material. The rolling bearing excels in the durability and heat resistance even if it is used in a high-temperature high-speed environment, and does not cause a noise fault.

1 Claim, 7 Drawing Sheets

×100

×100

ROLLING BEARING

FIELD OF THE INVENTION

The present invention relates to a rolling bearing, and more particularly to a rolling bearing used in a turbocharger of an automobile or the like.

BACKGROUND OF THE INVENTION

A rolling bearing used in a turbocharger of an automobile or the like is generally used under a severe condition in which the rolling bearing is subjected to cyclic shear stress under a bearing pressure, it is necessary to ensure a rolling fatigue life capable of withstanding the sear stress. In addition, with this type of rolling bearing, it is necessary to avoid the occurrence of wear attributable to the sliding between a rolling element and a race in operation, so that it is required that its wear resistance be excellent. For this reason, with conventional rolling bearings, a high-carbon chromium bearing steel (SUJ2) is used as the material of the rolling element and the material of the races, and the high-carbon chromium bearing steel is subjected to quenching and tempering treatment so as to ensure the rolling fatigue life and wear resistance.

In recent years, in conjunction with the tendency toward the higher load and higher speed of the machines using the rolling bearings, the working conditions of the rolling bearings have become increasingly severe, so that the rolling fatigue characteristic and the wear resistance characteristic in the present situation are becoming unsatisfactory. In particular, in the case of the rolling bearing used in a turbocharger of an automobile or the like, its average working temperature is very high at, e.g.., 150–200° C. (maximum working temperature: 300° C.), the rolling bearing while in use rotates at high speed, and the operation undergoes rapid acceleration and deceleration in a range of 0 to 180,000 r.p.m. Consequently, this results in a decline in the hardness of the high-carbon chromium bearing steel used as the material of the bearing, with the result that it has become impossible to satisfy the desired rolling fatigue characteristic and wear resistance.

In addition, under the aforementioned working environment at high temperature and high speed, it is also required that the dimensional stability of the races be excellent. To obtain such excellent dimensional stability, it is necessary to effect tempering treatment at a temperature higher than the working temperature of the bearing, so that it is necessary to use a heat resisting material which excels in strength at elevated temperature and makes it possible to obtain sufficient hardness even if tempering treatment at high temperature is carried out.

Accordingly, as a rolling bearing which excels in the hardness at elevated temperature and satisfies the rolling fatigue characteristic and the wear resistance characteristic, a rolling bearing using a heat resisting steel, such as M50, which contains large amounts of carbide formers (Cr, Mo, V, etc.) has been proposed (e.g., Japanese Utility Model Application Publication No. 8-9452).

In that rolling bearing, a heat resisting steel is used as the material of the bearing, and the heat resisting steel is subjected to tempering treatment at a predetermined temperature of 500° C. or thereabouts to allow fine carbides to be secondarily precipitated, thereby ensuring heat resistance. Thus, a decline and the like in the hardness in the use at high temperature are suppressed, and an attempt is thereby made to improve the rolling fatigue life and the wear resistance characteristic under a high-temperature high-speed environment.

With a turbocharger of an automobile, chances for performing the maintenance of oil are few as compared with other turbochargers, and a fine filter cannot be used for supplying lubricating oil to the bearing, thereby increasing the possibility that foreign matters incorporate in the lubricating oil. If the foreign matters enter between the rolling element and the race and bite into them, impressions are caused on the traveling portions of the bearings. As a result, there has been a problem in that the so-called early flaking of the impression starting-point type occurs in which an impression constitutes the starting point of flaking, resulting in the early breakage of the bearing. That is, although the presence of the residual austenite on the surface of the material is effective in preventing the early flaking of the impression starting-point type, in the conventional rolling bearing using the aforementioned heat resisting steel, the heat resistance is ensured by causing fine carbides to be secondarily precipitated, so that practically no residual austenite exists in the surface of the material. Hence, there has been a problem in that the conventional rolling bearing using the aforementioned heat resisting steel is inferior in durability, and causes early breakage of the bearing results.

In addition, if particularly hard foreign matters such as abrasive grains, among the aforementioned foreign matters, bite between the rolling element and the race, there are cases there the foreign matter sinks into the traveling portion of the race and becomes anchored therein. If the rolling element rolls on the traveling portion of the race in such a state, the concentration of strip local impressions occurs in the rolling element. The rolling element, in which such a concentration of strip impressions occurred, rotates in the bearing while changing its axis of rotation, so that a noise fault occurs.

SUMMARY OF THE INVENTION

The present invention has been devised in view of the above-described problems, and an object of the present invention is to provide a above-described problems, and an object of the present invention is to provide a rolling bearing which excels in the rolling fatigue life and the wear resistance characteristic even under the working conditions at high temperature and high speed, and does not cause a noise fault.

To prevent the occurrence of the aforementioned noise fault by avoiding the local concentration of impressions in the rolling element, it is considered desirable to use a ceramic material excellent in wear resistance. If a ceramic is used as the material of the rolling element, in a case where foreign matters have bitten between the rolling element and the race, impressions attributable to such biting one-sidedly occur in the race formed of a steel which is inferior in hardness, and the configuration of the impression becomes large and deep as compared with a case where a rolling element formed of an alloy steel material is used. If the configuration of the impression becomes large and deep, the concentration of stress at the edge of the impression also becomes large, and breakage due to the early flaking of the impression starting-point type is liable to occur.

Accordingly, as a result of conducting strenuous research and study, the present inventors obtained knowledge that, by subjecting an alloy steel material containing appropriate amounts of Si, Cr, and Mo incorporated therein to carbonitriding treatment, it is possible to improve the strength at elevated temperature of the matrix (martensite structure) of the material, and allow the residual austenite, which is effective in preventing the flaking of the impression starting-point type, to exist in the surface of the material.

The present invention has been devised on the basis of the above-described knowledge, and in accordance with the present invention there is provided a rolling bearing comprising: races including an inner race and an outer race formed of an alloy steel material; and a plurality of rolling elements formed of a ceramic material and interposed between the inner race and the outer race such that the rolling elements rotate freely, wherein at least one of the inner race and the outer race is formed of an alloy steel containing 0.7–1.5 wt. % Si, 0.5–2.0 wt. % Cr, and 0.5–2.0 wt. % Mo in a steel, and the surface of the alloy steel is subjected to carbonitriding treatment.

In accordance with the above-described structure, since the ceramic is used as the material of the rolling element, it becomes possible to avoid the occurrence of the local concentration of strip impressions in the rolling element, and overcome the deterioration in the noise. In addition, since at least one of the inner race and the outer race is formed of an alloy steel containing 0.7–1.5 wt. % Si, 0.5–2.0 wt. % Cr, and 0.5–2.0 wt. % Mo in a steel and the surface of the alloy steel is subjected to carbonitriding treatment, the strength at elevated temperature of the race improves, and the residual austenite is allowed to exist in the surface. Accordingly, by subjecting such a race material to predetermined hardening and tempering treatment, it is possible to obtain a rolling bearing in which the early flaking of the impression starting-point type does not occur.

Furthermore, although the dimensional stability can be improved by effecting tempering treatment at a temperature higher than the working temperature as described above, if a large amount of residual austenite exists in the steel even if tempering treatment is effected at such a temperature, the dimension of the bearing undergoes a change due to the decomposition of the residual austenite with a lapse of time, leading to the deterioration of the dimensional stability. That is, in order to prevent the flaking of the impression starting-point type by causing the residual austenite to exist in the surface and, at the same time, improve the dimensional stability, it is necessary to control the amount of the residual austenite in the steel at a low level. For this purpose, it is necessary to minimize the amount of residual austenite in the core portion as much as possible.

Accordingly, as a result of conducting strenuous research and study, the present inventors obtained knowledge that, in order to obtain desired dimensional stability, the average amount of residual austenite in the surface and the core of the bearing needs to be set to 5 vol. % or less, and it became clear that, to this end, the carbon concentration in the material (prior to carbonitriding), on which the amount of residual austenite depends, is preferably set in the range of 0.3 to 0.6 wt. %.

It is preferred that the diameter of a carbide in the surface of the raceway track is 4 μm or less or the amount of residual austenite in the surface of the raceway track is 5 vol. % or less.

The rolling bearing in which the inner race is formed of the alloy steel containing 0.7–1.5 wt. % Si, 0.5–2.0 wt. % Cr, and 0.5–2.0 wt. % Mo in the steel, and is subjected to carbonitriding treatment such that the surface carbon concentration at the surface of the raceway track of said inner race is 0.8 wt. %–1.1 wt. %, and the surface nitrogen concentration thereof is 0.2–0.6 wt. % is preferably used for a turbocharger.

BRIEF DESCRIPTION OF THE DRAWINGS

FIG. 11(a) is a photograph illustrating peeling damage occurring in the rolling element.

DETAILED DESCRIPTION OF THE INVENTION

Figure 1:
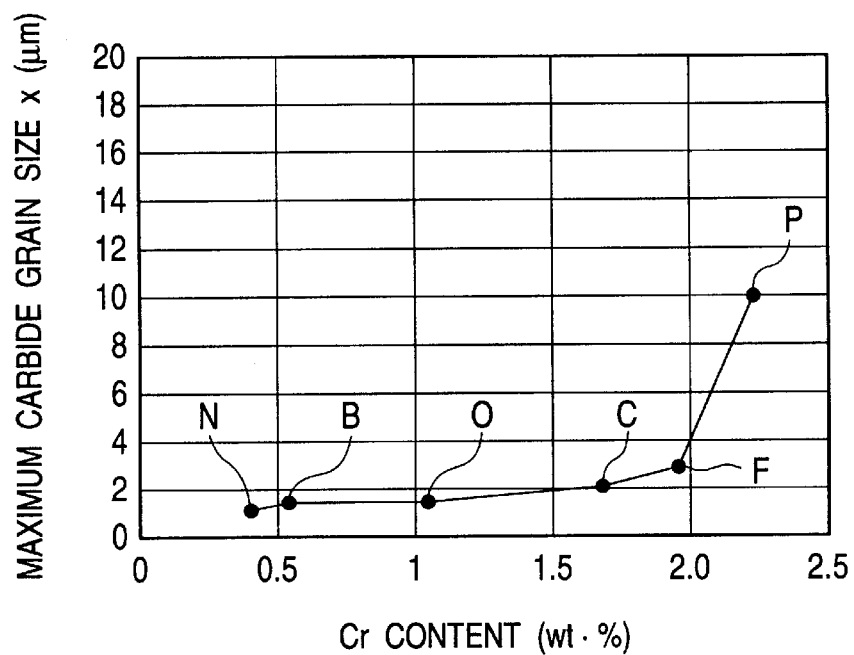
FIG. 1 is a characteristic diagram illustrating the relationship between the maximum carbide grain size x and the Cr content.

Next, a detailed description will be given of an embodiment of the rolling bearing in accordance with the present invention.

As described above, the rolling bearing in accordance with this embodiment comprises: races including an inner race and an outer race formed of an alloy steel material; and a plurality of rolling elements formed of a ceramic material and interposed between the inner race and the outer race such that the rolling elements rotate freely, wherein at least one of the inner race and the outer race is formed of an alloy steel containing 0.7–1.5 wt. % Si, 0.5–2.0 wt. % Cr, and 0.5–2.0 wt. % Mo in a steel, and is subjected to carbonitriding treatment. It is preferred that a surface carbon concentration at a surface of a raceway track of the at least one of the inner race and the outer race is from 0.8 to 1.1 wt %, and a surface nitrogen concentration thereof is from 0.2 to 0.6 wt. %.

It is preferred that the inner race is made of the above-specified alloy steel, and it is most preferred that both inner race and outer race are made of the above-specified alloy steel.

Hereafter, a description will be given of the reason for limiting the range of the components of the rolling bearing and the reason for provision of carbonitriding.

(1) Si

Si (silicon) is an element which is effective in resisting property for temper softening, and has the effects of improving the strength at elevated temperature and of retarding the decomposition of residual austenite which is effective in the prevention of the flaking of the impression starting-point type in a high-temperature environment. However, to allow such effects to be exhibited, it is necessary for add Si by at least 0.7 wt. % or more. On the other hand, if the content of Si is excessively large, a decline in the mechanical strength results, and since Si is an element having carburization-inhibiting properties, the upper limit of the Si content was set at 1.5 wt. %. That is, the content of Si is limited to the range of 0.7 to 1.5 wt. %.

(2) Cr and Mo

In the same way as Si, Cr (chromium) and Mo (molybdenum) are elements which are effective in resisting property for temper softening, and have the effect of improving the strength at elevated temperature. In addition, Cr and Mo are elements which function as carbide forming elements for forming very small carbides on the carbonitrided surface, and are elements which are effective in the prevention of the flaking of the impression starting-point type. To allow such effects to be exhibited, it is necessary to add both Cr and Mo by 0.5 wt. % or more. On the other hand, if the contents of Cr and Mo exceed 2.0 wt. %, excessively large carbides are formed at the stage of the material, which lead to the falling off of the carbides, shortening the rolling fatigue life of the bearing to the contrary. Therefore, the contents of both Cr and Mo are limited to the range of 0.5 to 2.0 wt. %.

(3) C

As described above, if the amount of residual austenite is excessively large, the residual austenite decomposes, which results in a change in the dimension with a lapse of time, thereby impairing the dimensional stability. On the other hand, the presence of the residual austenite in the surface of the race is effective in the prevention of the flaking of the impression starting-point type. Accordingly, it is preferable to limit the amount of the residual austenite occupied in the overall bearing after the residual austenite is allowed to exist in the surface. For this purpose, it is necessary to control the residual austenite in the core portion of the bearing. From such a standpoint, the average amount of residual austenite in the surface and the core of the bearing is preferably set to 5 vol. % or less. To this end, the carbon concentration (C), on which the-residual austenite depends, needs to be set at 0.6 wt. % or less. On the other hand, if the carbon concentration is made excessively low, it takes a long time in obtaining a predetermined carburization depth in carbonitriding, a higher cost results as a whole. In view of such aspects, it is necessary to set the carbon concentration in the steel to 0.3 wt. % or more. Accordingly, in order to make the dimensional stability more favorable, it is preferable to limit the carbon concentration in the steel to 0.3 to 0.6 wt. %.

(4) Carbonitriding Treatment

The reason for providing carbonitriding as surface treatment is as follows:

i) By adding C (carbon) to the surface, it is possible to strengthen the solid solution of the matrix (martensite structure), and a large amount of residual austenite, which is effective in the prevention of the flaking of the impression starting-point type, can be formed in an outermost surface layer portion.

ii) By adding N (nitrogen) to the surface, it is possible to improve the tempering resistance and the strength at elevated temperature and attain improvement in wear resistance, and a large amount of residual austenite, which is effective in the prevention of the flaking of the impression starting-point type, can be caused to exist in the outermost surface layer portion. Moreover, the carbides which are formed at the surface are very fine, so that it is possible to prevent the carbides from falling off.

It should be noted that as the treatment conditions of carbonitriding, it is preferable to set the conditions such that the surface carbon concentration after carbonitriding treatment is in the range of 0.8 to 1.1 wt. %, and the surface nitrogen concentration is in the range of 0.2 to 0.6 wt. %. The reason for this is that if the surface carbon concentration is 0.8 wt. % or less, the surface hardness is reduced, so that the rolling fatigue life and the wear resistance deteriorate. If the surface carbon concentration exceeds 1.1 wt. %, exceedingly large carbides are precipitated during carbonitriding, thereby shortening the rolling fatigue life. On the other hand, if the surface nitrogen concentration is 0.2 wt. % or less, the strength at elevated temperature drops, and the wear resistance deteriorates, while if the surface nitrogen concentration exceeds 0.6 wt. %, the grinding finish becomes difficult to perform during the manufacture of the bearing, thereby lowering the productivity of the bearings.

The surface carbon concentration and surface nitrogen concentration can be measured by means of emission spectrochemical analysis, and the diameter of a carbide and the amount of residual austenite can be measured by means of image analysis and X-ray diffraction, respectively, according to known methods.

EXAMPLES

Next, a specific description will be given of examples of the rolling bearing in accordance with the present invention.

In cases where the rolling bearing is used under high-temperature high-speed conditions as in the turbocharger of an automobile, a tangential force acting on the surface of the race becomes large due to the difficulty in forming an oil film and the occurrence of spin sliding. Consequently, if excessively large carbides exist in the material of the race, a flaw occurs in the structure due to the falling off of the excessively large carbides, resulting in the shortening of the rolling fatigue life. In addition, if the excessively large carbides which fell off become mixed in the lubricating oil as foreign matters, and the foreign matters bite between the race and the rolling element, impressions are formed, thereby possibly resulting in the shortening of the rolling fatigue life. Accordingly, in the surface of the material it is necessary to eliminate the presence of the excessively large carbides and cause fine carbides to exist therein. For this purpose, it is necessary to minimize the maximum carbide grain size x.

Accordingly, the present inventors fabricated races A to U (each including the inner race and outer race) having the component compositions and subjected to heat treatment shown in Table 1, observed the microstructures of the race material, and measured the maximum carbide grain size x.

TABLE 1

| | Chemical Components (wt %) | | | | | Quality after Heat Treatment Surface | | Maximum Carbide Grain Size |
|---|---|---|---|---|---|---|---|---|---|
| Race No. | Si | Cr | Mo | C | V | Heat Treatment[1)] | C % | N % | ($\mu$m) |
| A | 0.87 | 1.50 | 0.87 | 0.67 | — | a | 1.06 | 0.35 | 1.3 |
| B | 1.01 | 0.55 | 0.99 | 0.79 | — | a | 1.05 | 0.33 | 1.6 |
| C | 0.96 | 1.67 | 0.59 | 0.72 | — | a | 0.99 | 0.34 | 2.1 |
| D | 0.99 | 1.48 | 0.95 | 0.41 | — | a | 0.99 | 0.30 | 1.2 |
| E | 0.75 | 1.43 | 1.00 | 0.56 | — | a | 0.95 | 0.27 | 1.3 |
| F | 1.01 | 1.94 | 1.05 | 0.42 | — | a | 1.01 | 0.29 | 2.8 |
| G | 1.16 | 1.23 | 1.95 | 0.51 | — | a | 0.98 | 0.31 | 3.2 |
| H | 0.99 | 1.48 | 0.95 | 0.41 | — | a | 0.82 | 0.21 | 1.0 |
| I | 0.99 | 1.48 | 0.95 | 0.41 | — | a | 1.08 | 0.45 | 2.9 |
| J | *0.23 | 1.45 | — | *1.00 | — | b | 1.00 | — | 1.2 |
| K | *0.20 | *4.02 | *4.01 | *0.81 | 1.00 | b | 0.80 | — | 12.0 |
| L | 0.99 | 1.48 | 0.75 | *0.86 | — | *b | 0.86 | — | 1.1 |
| M | *0.65 | 1.67 | 0.67 | 0.40 | — | a | 0.95 | 0.28 | 1.6 |
| N | 1.23 | *0.42 | 1.51 | 0.42 | — | a | 1.01 | 0.32 | 1.2 |
| O | 1.13 | 1.06 | *0.44 | 0.42 | — | a | 0.98 | 0.39 | 1.5 |
| P | 0.88 | *2.19 | 1.23 | 0.42 | — | a | 1.00 | 0.29 | 9.8 |
| Q | 0.98 | 1.46 | *2.13 | 0.43 | — | a | 1.01 | 0.30 | 8.4 |
| R | 0.99 | 1.48 | 0.95 | 0.41 | — | *c | 0.97 | — | 1.4 |
| S | 0.99 | 1.48 | 0.95 | 0.41 | — | a | *0.75 | 0.25 | 0.9 |
| T | 0.99 | 1.48 | 0.95 | 0.41 | — | a | *1.19 | 0.28 | 11.1 |
| U | 0.99 | 1.48 | 0.95 | 0.41 | — | a | 1.02 | *0.15 | 1.8 |

[1)]a: carbonitriding treatment → hardening/tempering
b: through hardening
c: carburizing → hardening/tempering In Table 1, the mark * denotes the component composition and the like outside the range of the present invention limited in the above-described embodiment (excluding the C component).

A race M shows a case where the content of Si was insufficient. Further, races N and O show cases where Cr and Mo were insufficient, respectively, while races P and Q show cases where Cr and Mo were excessive, respectively.

A race L is one which was not subjected to carbonitriding treatment, but subjected to so-called through hardening, while a race R is one which was subjected to carburizing treatment instead of being subjected to carbonitriding treatment.

Races S and T show cases where the surface carbon concentration after heat treatment was insufficient or excessive, respectively, while a race U shows a case where the surface nitrogen concentration after heat treatment was insufficient.

Races J and K show conventional examples, in which the race J was formed of a high-carbon chromium bearing steel (SUJ2), while the race K was formed of a heat resisting steel (M50).

In contrast, races A to I were respectively fabricated as falling within the range of the present invention, and the races D to I, in particular, were races which were fabricated as falling within the range of the present invention including the carbon concentration in the steel.

Figure 2:
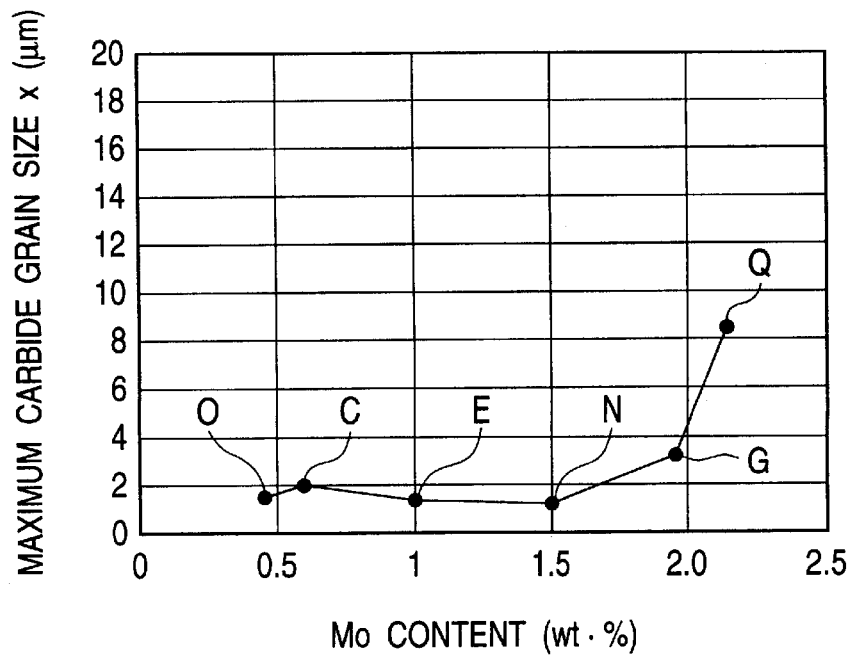
FIG. 2 is a characteristic diagram illustrating the relationship between the maximum carbide grain size x and the Mo content.
Figure 3:
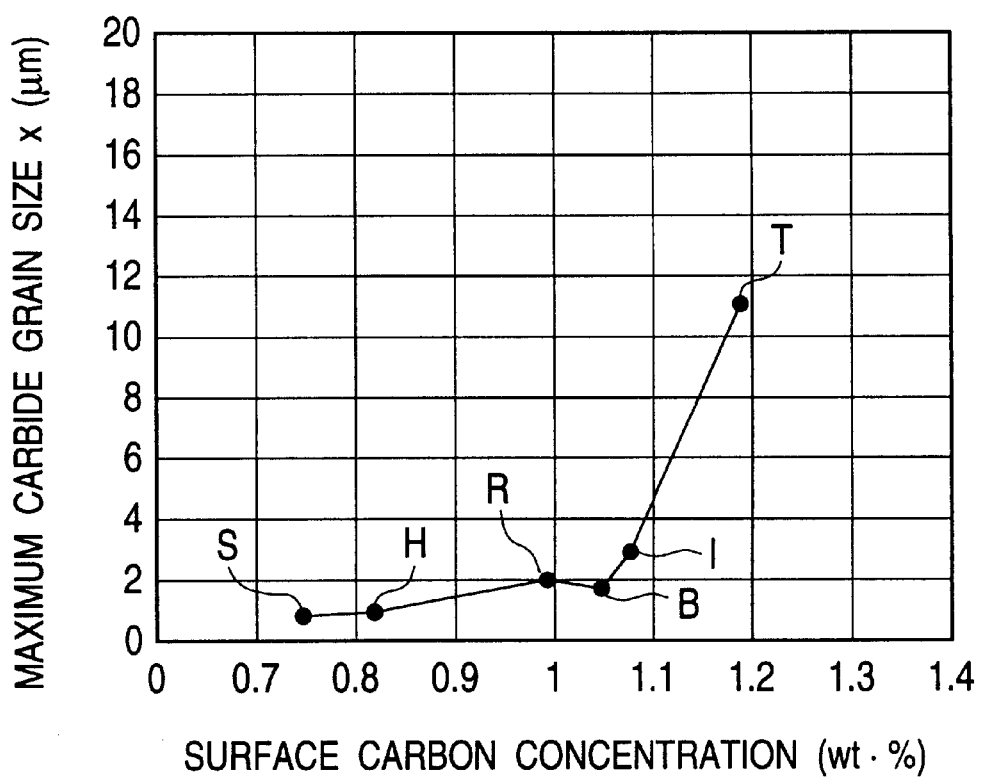
FIG. 3 is a characteristic diagram illustrating the relationship between the maximum carbide grain size x and the surface carbon concentration.

FIGS. 1 to 3 are characteristic diagrams illustrating the relationships between the maximum carbide grain size x and the Cr content, the Mo content, and the surface carbon concentration (surface C %), respectively.

FIG. 1 is a characteristic diagram illustrating the relationship between the maximum carbide grain size x and the Cr content. As is apparent from FIG. 1, it can be seen that if the Cr content exceeds 2 wt. %, the maximum carbide grain size x becomes extremely large, and excessively large carbides having a diameter of more than 4 $\mu$m are formed.

In addition, FIG. 2 is a characteristic diagram illustrating the relationship between the maximum carbide grain size x and the Mo content. As is apparent from FIG. 2, it can be seen that if the Mo content exceeds 2 wt. %, the maximum carbide grain size x becomes extremely large, and excessively large carbides having a diameter of more than 4 $\mu$m are formed as in the case of Cr.

Furthermore, FIG. 3 is a characteristic diagram illustrating the relationship between the maximum carbide grain size x and the surface carbon concentration. As is apparent from FIG. 3, it can be seen that if the surface carbon concentration exceeds 1.1 wt. %, the maximum carbide grain size x becomes extremely large, and excessively large carbides having a diameter of more than 4 $\mu$m are formed.

Thus, from the results of these microscopic observations, it can be appreciated that the upper limits of Cr, Mo, and the surface carbon concentration should be limited to 2 wt. %, 2 wt. %, and 1.1 wt. %, respectively.

Next, the present inventors fabricated rolling elements using as their basic materials a high-carbon chromium bearing steel (SUJ2), a heat resisting steel (M50), and silicon nitride ($Si_3N_4$) as a ceramic material.

Table 2 shows the composition of components of the rolling elements and a method of fabricating the same. A rolling element I was fabricated by subjecting the high-carbon chromium bearing steel (SUJ2) to through hardening; a rolling element II was fabricated by subjecting the heat resisting steel (M50) to through hardening; and a rolling element III was fabricated by using the known hot isostatic pressing (HIP) process with respect to silicon nitride ($Si_3N_4$). The rolling elements I and II were conventional examples, and the rolling element III corresponds to the embodiment of the present invention.

TABLE 2

| Rolling Element No. | Chemical Components (wt %) | | | | | Production Condition |
|---|---|---|---|---|---|---|
| | Si | Cr | Mo | C | V | |
| I | 0.23 | 1.45 | — | 1.00 | — | through hardening |
| II | 0.20 | 4.02 | 4.01 | 0.81 | 1.00 | through hardening |
| III | | | $Si_3N_4$ | | | HIP method |

Next, the present inventors manufactured rolling bearings by combining the races A to U shown in Table 1 as the inner and outer races and the rolling elements I to III shown in Table 2, as shown in Table 3, and with respect to these manufactured rolling bearings, various evaluation tests were conducted, including (1) a test for evaluating the strip wear of the rolling element, (2) a test for evaluating flaking life ($L_{10}$ life), (3) a test for evaluating spin sliding wear, (4) a test for evaluating fatigue wear (test for evaluating peeling damage), and (5) evaluation of dimensional stability. In Table 3, Examples 1 to 9 show rolling bearings which fall within the range of the present invention. In addition, Conventional Examples 10 and 11 show cases in which the high-carbon chromium bearing steel (SUJ2) and the heat resisting steel (M50) were used as the materials of the bearings, respectively. Comparative Examples 12 to 21 show rolling bearings in which either the race or the rolling element falls outside the range of the present invention.

It should be noted that the manufactured rolling bearings were angular ball bearings of the 7205C type. As cages for retaining the rolling elements, those in which a polyimide-made material injection molded with a predetermined configuration was subjected to barrel processing were used.

lubricating oil, the foreign matters sink into the race and becomes anchored therein. Accordingly, if the rolling element passes the race in which such foreign matters are anchored, the concentration of strip impressions occurs in the rolling element, and the noise characteristic deteriorates.

Figure 4:
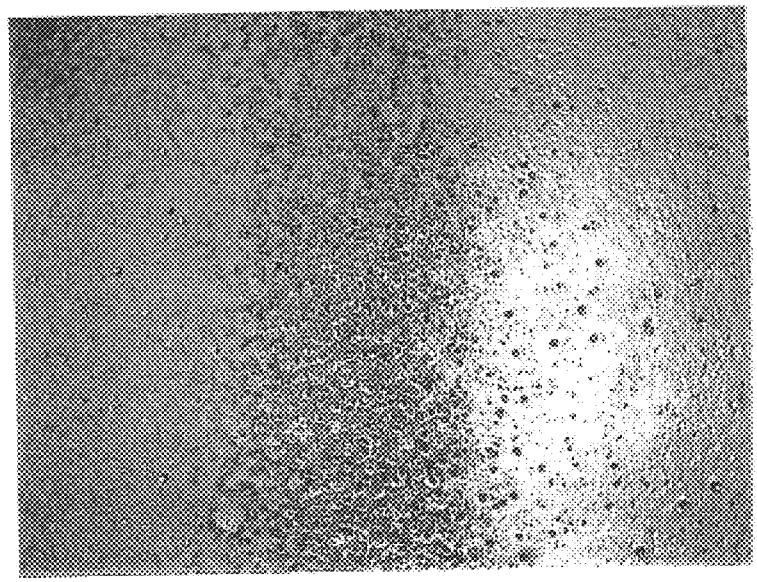
FIG. 4(a) is a photograph illustrating the state of strip wear occurring in a rolling element.
FIG. 4(b) is a photograph illustrating the state of strip wear occurring in a rolling element.
Figure 4:
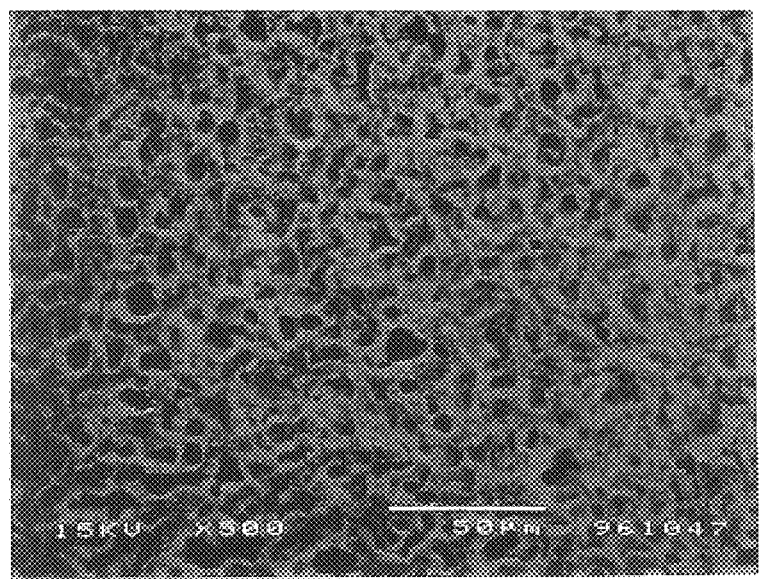

FIG. 4(a) is a photograph illustrating the state of a rolling element in the case where the rolling element traveled on the race with a foreign matter anchored therein, and FIG. 4(b) is an enlarged photograph of FIG. 4(a).

As shown in FIG. 4(b), if the rolling element travels on the race with a foreign matter anchored therein, impressions shown in black occur in a concentrated manner on the surface of the rolling element, and the occurrence of such a concentration of impressions leads to the deterioration of the noise characteristic.

Accordingly, after operating the rolling bearings in Table 3 for a fixed period of time (500 hours), the present inventors observed the surfaces of the rolling elements, measured the configurations of the rolling elements and the like, and evaluated the strip wear depending on whether impressions occurred or not.

The test conditions for evaluation of the strip wear were as shown below, and the test results are shown in Table 4.

Test Conditions for Evaluating Strip Wear

Test machine: Ball bearing life testing machine (made by NSK Ltd.)

Test bearings: 7205C type (angular ball bearing)

Test load: 100 kgf (axial load)

No. of revolutions: 25,000 rpm

Calculated life: 1,534 hours

Test temperature: 200° C.

Lubrication type: oil bath

TABLE 3

| | Bearing No. | Race No. | Rolling Element No. | Remarks |
|---|---|---|---|---|
| Examples | 1 | A | III | |
| | 2 | B | III | |
| | 3 | C | III | |
| | 4 | D | III | |
| | 5 | E | III | |
| | 6 | F | III | |
| | 7 | G | III | |
| | 8 | H | III | |
| | 9 | I | III | |
| Conventional Examples | 10 | J | I | SUJ2 |
| | 11 | K | II | M50 |
| Comparative Examples | 12 | K | III | Race: M50, rolling element: $Si_3N_4$ |
| | 13 | D | II | Rolling element: M50 |
| | 14 | L | III | Race was not subjected to carbonitriding. |
| | 15 | M | III | Amount of Si in race was insufficient. |
| | 16 | N | III | Amount of Cr in race was insufficient. |
| | 17 | O | III | Amount of Mo in race was insufficient. |
| | 18 | R | III | Race was not subjected to nitriding. |
| | 19 | S | III | Surface C % in race was insufficient. |
| | 20 | T | III | Surface C % in race was excessive. |
| | 21 | U | III | Surface N % in race was insufficient. |

Hereafter, a description will be given of the tests for evaluating the rolling bearings.

(1) Test for Evaluating Strip Wear of Rolling Element

As described above, the rolling bearings used in turbochargers of automobiles are frequently used in a state in which foreign matters are mixed in lubricating oil, and in a case where small foreign matters, such as abrasive grains having higher hardness than a steel-made race material and having grain sizes of 20 $\mu$m or less, are mixed in the Lubricating oil: MIL-L-23699C lubricating oil (made by Mobil)

Test operation time: 500 hours

Foreign matters: alumina powder ($Al_2O_3$)

Vickers hardness Hv: 1,500 or more

Grain size: 5 to 10 $\mu$m

Concentration: 100 ppm

TABLE 4

| | Bearing No. | Surface of Rolling Element |
|---|---|---|
| Examples | 1 | No impressions |
| | 2 | " |
| | 3 | " |
| | 4 | " |
| | 5 | " |
| | 6 | " |
| | 7 | " |
| | 8 | " |
| | 9 | " |
| Conventional | 10 | " |
| Examples | 11 | Impressions were observed as a whole, and concentration of strip impressions occurred locally. |
| Comparative | 12 | No impressions |
| Examples | 13 | Impressions were observed as a whole, and concentration of strip impressions occurred locally. |
| | 14 | No impressions |
| | 15 | " |
| | 16 | " |
| | 17 | " |
| | 18 | " |
| | 19 | " |
| | 20 | " |
| | 21 | " |

As is apparent from Table 4, in Conventional Example 11 and Comparative Example 13 in which a heat resisting steel was used as the rolling element, impressions occurred as a whole, and the occurrence of the local concentration of strip impressions was observed. In the rolling bearings using $Si_3N_4$ for their rolling elements, the occurrence of impressions was not observed. Thus it can be seen that the use of a ceramic material, such as $Si_3N_4$, which excels in wear resistance as the material of the rolling element is effective in preventing the occurrence of the concentration of strip impressions, and is effective in suppressing the occurrence of strip wear.

(2) Test for Evaluating Flaking Life ($L_{10}$ Life)

As described above, in cases where the rolling bearing used in a turbocharger of an automobile is used in a state in which foreign matters are mixed in lubricating oil, there is a possibility that there occurs the flaking of the impression starting-point type in the race due to the biting and the like of the foreign matters into the race. The bearing performance is therefore required to excel in the flaking resistance characteristic against such flaking.

Therefore, the present inventors conducted a test for evaluating flaking life by using five pieces of the respective rolling bearings shown in Table 3 as test pieces. It should be noted that the flaking life was evaluated by attaching a vibrometer at an appropriate position on the test machine in the vicinity of the test piece, and by judging that flaking damage occurred in the test piece when a measured value of the vibrometer showed a predetermined value or more.

It should be noted that the test conditions for evaluating flaking life were as follows:
Test Conditions for Evaluating Flaking Life
  Test machine: Ball bearing life testing machine (made by NSK Ltd.)
  Test bearings: 7205C type (angular ball bearing)
  Test load: 250 kgf (axial load)
  No. of revolutions: 25,000 rpm
  Calculated life: 155 hours
  Test temperature: 200° C.
  Lubrication type: oil bath
  Lubricating oil: MIL-L-23699C lubricating oil (made by Mobil)
  Foreign matters: steel powder
    Vickers hardness Hv: 870
    Grain size: 37 to 74 μm
    Concentration: 100 ppm In addition, the test results were rearranged in accordance with the Weibull distribution, and the flaking life of each bearing was evaluated by calculating $L_{10}$ life. Table 5 shows $L_{10}$ life of each test bearing.

TABLE 5

| | Bearing No. | $L_{10}$ Life (Time) |
|---|---|---|
| Examples | 1 | 292 |
| | 2 | 285 |
| | 3 | 252 |
| | 4 | 330 |
| | 5 | 298 |
| | 6 | 352 |
| | 7 | 380 |
| | 8 | 278 |
| | 9 | 343 |
| Conventional | 10 | 46 |
| Examples | 11 | 192 |
| Comparative | 12 | 98 |
| Examples | 13 | 416 |
| | 14 | 70 |
| | 15 | 136 |
| | 16 | 145 |
| | 17 | 119 |
| | 18 | 132 |
| | 19 | 99 |
| | 20 | 150 |
| | 21 | 148 |

As is apparent from a comparison between Example 4 and Comparative Example 13 and between Conventional Example 11 and Comparative Example 12 in Table 5, it can be appreciated that in cases where the same material of the race is used, if $Si_3N_4$ is used as the material of the rolling element, the $L_{10}$ life is reduced as compared with the case where an alloy steel material is used. Conceivably, this is attributable to the fact that since the material of the race is softer than the material of the rolling element, in the event that foreign matters have bitten between the rolling element and the race, such impressions that increase the concentration of stress at impression edges occur in the race, with the result that an adverse effect is exerted on the race life.

Therefore, in the case where a ceramic excelling in wear resistance such as $Si_3N_4$ is used as the material of the rolling element, it is necessary to select a material of the race which will not cause the flaking of the impression starting-point type in the race.

Accordingly, as shown in FIGS. 5 to 9, the present inventors plotted the relationships between the $L_{10}$ life and each of contents of Si, Cr, and Mo in the steel, the surface carbon concentration, and the surface nitrogen concentration, and made comparison with the calculated life. In theses figures, numeral before parentheses and alphabet in parentheses indicate the bearing and the race used.

Figure 5:
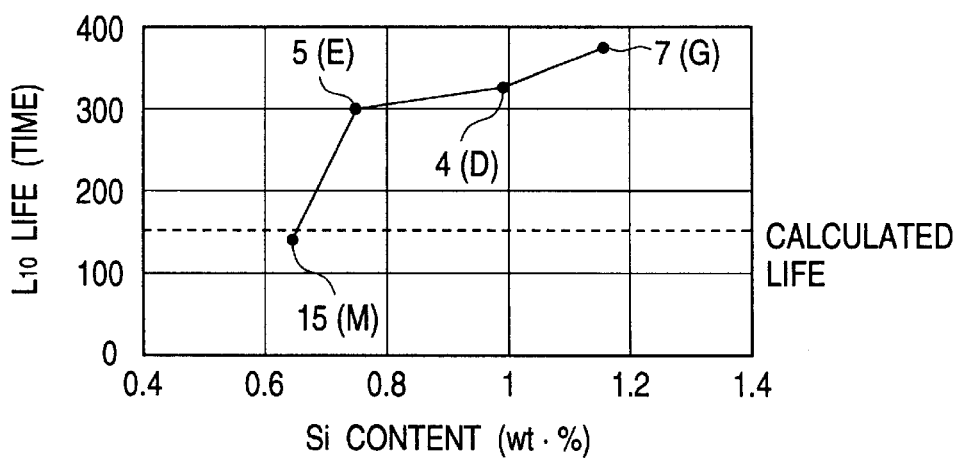
FIG. 5 is a characteristic diagram illustrating the relationship between the $L_{10}$ life and the content of Si.

FIG. 5 is a characteristic diagram illustrating the relationship between the $L_{10}$ life and the content of Si. In Comparative Example 15 (material of the race: M), since the Si content was as low as 0.65 wt. %, the $L_{10}$ life was 136 hours which was less than the calculated life (155 hours) of the bearing. Hence, it can be appreciated that, in order to ensure that the race life exceeds the calculated life of the rolling bearing, the Si content needs to be 0.7 wt. % or more.

Figure 6:
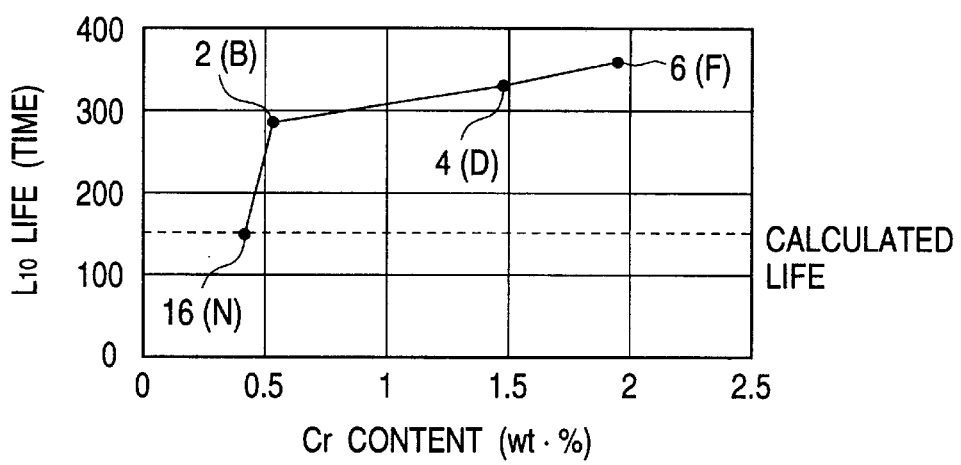
FIG. 6 is a characteristic diagram illustrating the relationship between the $L_{10}$ life and the content of Cr.

FIG. 6 is a characteristic diagram illustrating the relationship between the $L_{10}$ life and the content of Cr. In Comparative Example 16 (material of the race: N), since the Cr content was as low as 0.42 wt. %, the $L_{10}$ life was 145 hours which was less than the calculated life (155 hours) of the bearing. Hence, it can be appreciated that, in order to ensure that the race life exceeds the calculated life of the rolling bearing, the Cr content needs to be 0.5 wt. % or more.

Figure 7:
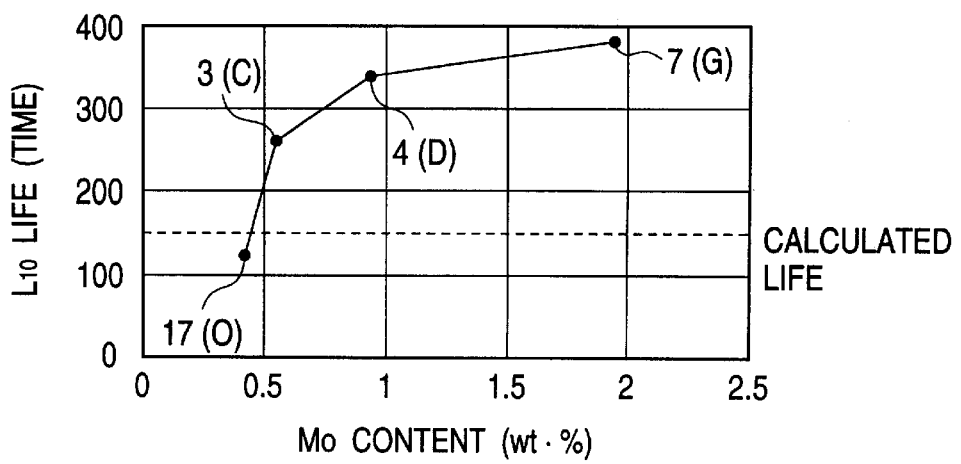
FIG. 7 is a characteristic diagram illustrating the relationship between the $L_{10}$ life and the content of Mo.

FIG. 7 is a characteristic diagram illustrating the relationship between the $L_{10}$ life and the content of Mo. In Comparative Example 17 (material of the race: O), since the Mo content was as low as 0.44 wt. %, the $L_{10}$ life was 119 hours which was less than the calculated life (155 hours) of the bearing. Hence, it can be appreciated that, in order to ensure that the race life exceeds the calculated life of the rolling bearing, the Mo content needs to be 0.5 wt. % or more.

Figure 8:
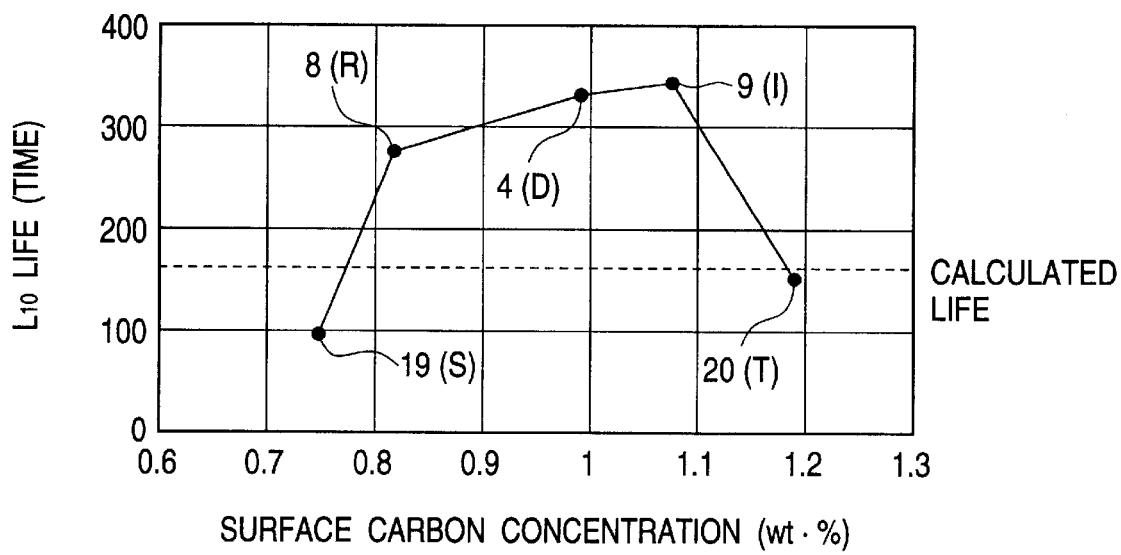
FIG. 8 is a characteristic diagram illustrating the relationship between the $L_{10}$ life and the surface carbon concentration.

FIG. 8 is a characteristic diagram illustrating the relationship between the $L_{10}$ life and the surface carbon concentration. In Comparative Example 19 (material of the race: S), since the surface carbon concentration was as low as 0.75 wt. %, the $L_{10}$ life was 99 hours which was less than the calculated life (155 hours) of the bearing. Hence, it can be appreciated that, in order to ensure that the race life exceeds the calculated life of the rolling bearing, the surface carbon concentration needs to be 0.8 wt. % or more. Meanwhile, in Comparative Example 20 (material of the race: T), since the surface carbon concentration was as high as 1.19 wt. %, excessively large carbides were produced and fell off, and flaws occurred in the structure. As a result, the $L_{10}$ life was 150 hours which was less than the calculated life (155 hours) of the bearing. Hence, it can be appreciated that the upper limit of the surface carbon concentration needs to be 1.1 wt. %.

Figure 9:
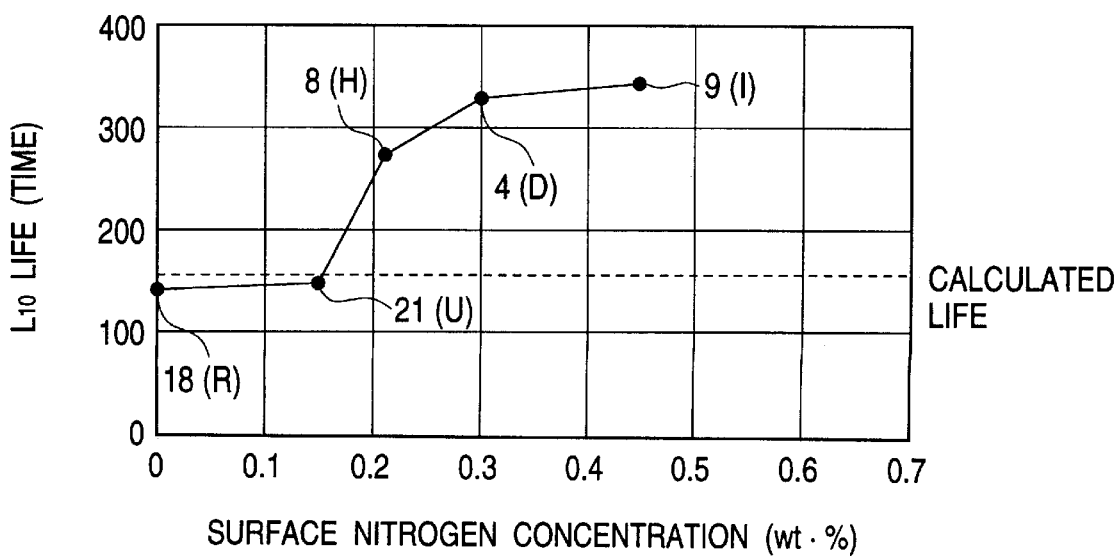
FIG. 9 is a characteristic diagram illustrating the relationship between the $L_{10}$ life and the surface nitrogen concentration.

FIG. 9 is a characteristic diagram illustrating the relationship between the $L_{10}$ life and the surface nitrogen concentration. In Comparative Example 21 (material of the race: U), since the surface nitrogen concentration was as low as 0.15 wt. %, the $L_{10}$ life was 148 hours which was less than the calculated life (155 hours) of the bearing. Hence, it can be appreciated that, in order to ensure that the race life exceeds the calculated life of the rolling bearing, the surface nitrogen concentration needs to be 0.2 wt. % or more.

As is apparent from the test results of the above flaking test, it was clarified that the Si content needs to be 0.7 wt. % or more; the Cr content needs to be 0.5 wt. % or more; the Mo content needs to be 0.5 wt. % or more; the surface carbon concentration needs to be 0.8–1.1 wt. %; and the surface nitrogen concentration needs to be 0.2 wt. % or more.

(3) Test for Evaluating Spin Sliding Wear

As the rolling bearing used in the turbocharger of an automobile, an angular ball bearing is generally used to allow an axial load to be received. However, when the angular ball bearing receives an angular load, a contact angle occurs, so that spin sliding occurs between the rolling element and the race.

Figure 10:
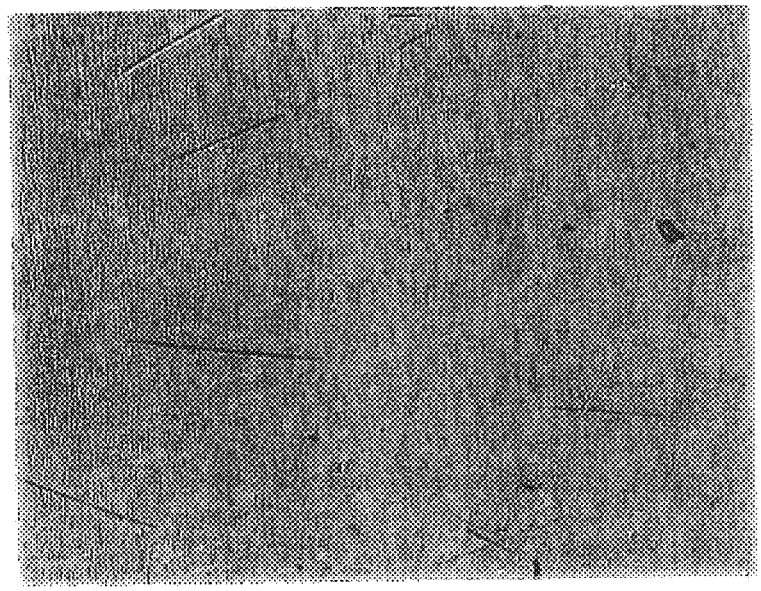
FIG. 10(a) is a photograph illustrating the state of spin wear occurring in the rolling element.
FIG. 10(b) is a photograph illustrating the state of spin wear occurring in the rolling element.
Figure 10:
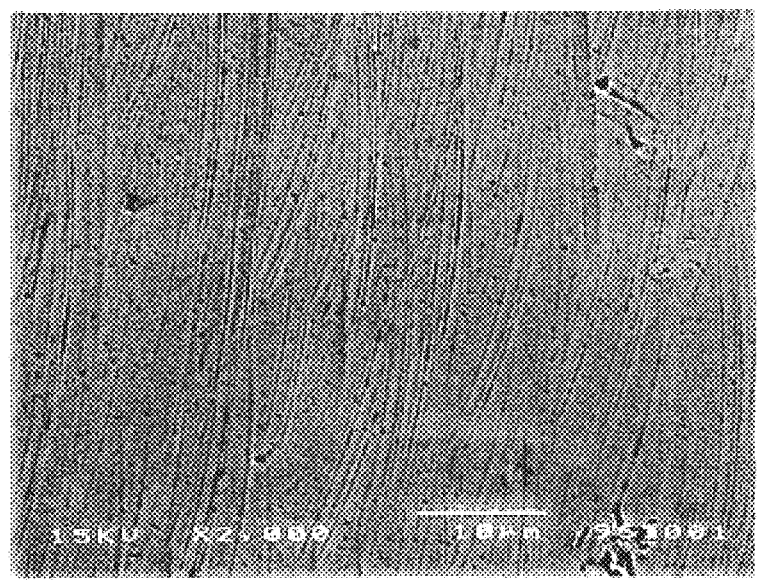

FIG. 10(a) is a photograph in a case where spin sliding has occurred, and FIG. 10(b) is an enlarged photograph of FIG. 10(a).

As shown in FIG. 10(b), in the case where an axial load is received, spin sliding occurs due to the contact angle between the race and the rolling element, with the result that a linear wear track occurs in the rolling element. Particularly in cases where the rolling bearing is used under a condition of high-speed rotation or in a high-temperature environment where an oil film is difficult to form as in the turbocharger of an automobile, it is necessary to avoid the occurrence of wear tracks due to the aforementioned spin sliding.

Accordingly, the present inventors operated the rolling bearings shown in Table 3 up to the calculated life (538 hours), observed the states of the surfaces of the races and the rolling elements by an optical microscope and an electron microscope after the test, and evaluated spin sliding wear.

The test conditions for evaluating the spin sliding wear were as follows, and Table 6 shows the test results.

Test Conditions for Evaluating Spin Sliding Wear

Test machine: Ball bearing life testing machine (made by NSK Ltd.)

Test bearings: 7205C type (angular ball bearing)

Test load: 150 kgf (axial load)

No. of revolutions: 25,000 rpm

Calculated life: 538 hours

Test temperature: 200° C.

Lubrication type: oil air (shutoff type) lubrication

Lubricating oil: MIL-L-23699C lubricating oil (made by Mobil)

Foreign matters: none

TABLE 6

|  | Bearing No. | Surface of Rolling Element | Surface of Race |
|---|---|---|---|
| Examples | 1 | No particular wear was observed. | No particular wear was observed. |
|  | 2 | " | " |
|  | 3 | " | " |
|  | 4 | " | " |
|  | 5 | " | " |
|  | 6 | " | " |
|  | 7 | " | " |
|  | 8 | " | " |
|  | 9 | " | " |
| Conventional Examples | 10 | Linear wear was observed. | Surface was worn (finished surface grains were not observed). |
|  | 11 | No particular wear was observed. | No particular wear was observed. |
| Comparative Examples | 12 | No particular wear was observed. | No particular wear was observed. |
|  | 13 | " | " |
|  | 14 | " | Surface was worn (finished surface grains were not observed). |
|  | 15 | " | No particular wear was observed. |
|  | 16 | " | " |

TABLE 6-continued

| Bearing No. | Surface of Rolling Element | Surface of Race |
|---|---|---|
| 17 | " | " |
| 18 | " | Surface was worn (finished surface grains were not observed). |
| 19 | " | No particular wear was observed. |
| 20 | " | " |
| 21 | " | Surface was worn (finished surface grains were not observed). |

As is apparent from Table 6, in Conventional Example 10, it was observed that linear wear tracks such as those shown in FIG. 10(b) occurred in the rolling element, and that the surface of the race was worn. Neither Comparative Example 14 (material of the race: L) nor Comparative Example 18 (material of the race: R) were subjected to carbonitriding treatment, and the surface nitrogen concentration was low in the case of Comparative Example 21 (material of the race: U), so that these rolling bearings were inferior in wear resistance, and it was noted that the surfaces of their races were worn. From these test results, it can be appreciated that the provision of carbonitriding treatment to the surface of the race to allow nitrogen to solidly dissolve contributes to the improvement of wear resistance.

(4) Test for Evaluating Fatigue Wear (Test for Evaluating Peeling Damage)

As described above, in cases where the rolling bearing used in the turbocharger of an automobile is used in a state in which foreign matters are mixed in lubricating oil, there is a possibility that there occurs the flaking of the impression starting-point type in the race. However, there is a possibility of the occurrence of fatigue wear (peeling damage) besides the flaking.

Figure 11:
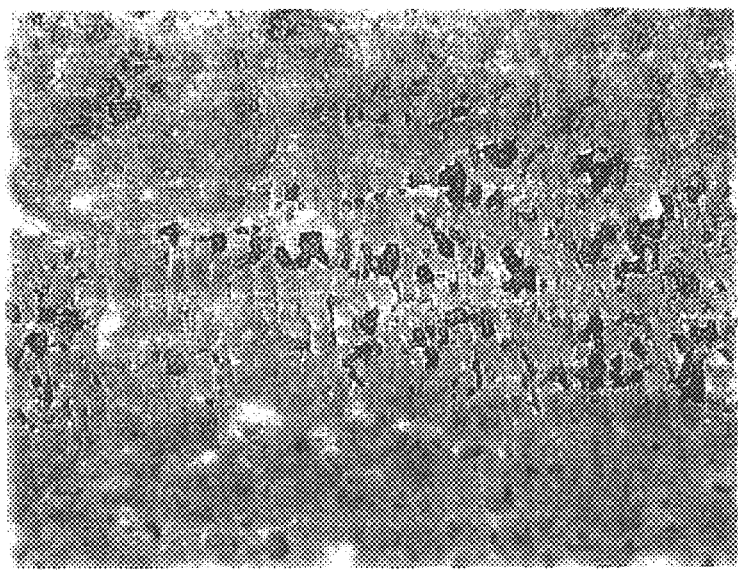
FIG. 11 (b) is a photograph illustrating peeling damage occurring in the rolling element.
Figure 11:
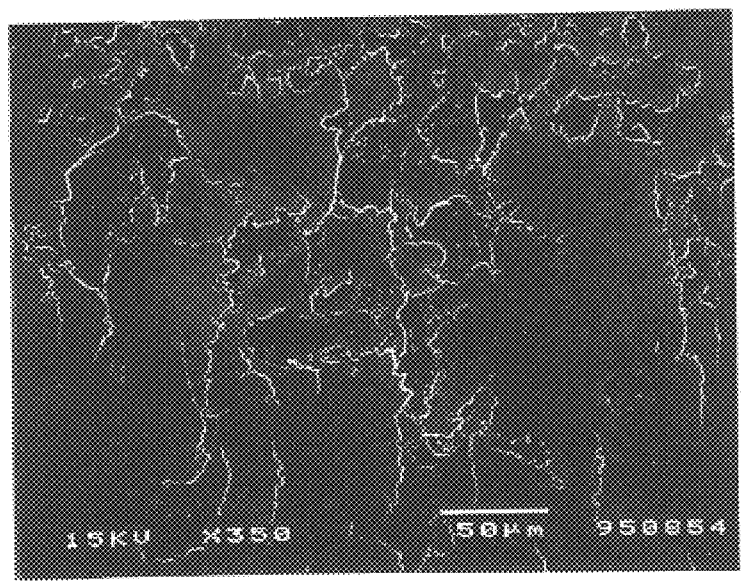

FIG. 11(a) is a photograph in a case where peeling damage has occurred in the race, and FIG. 11(b) is an enlarged photograph of FIG. 11(a).

As shown in FIG. 11(b), flake-like exfoliations occur on the surface of the race due to fatigue wear. Particularly in cases where the rolling bearing is used under a condition of high-speed rotation where sliding becomes large or in a high-temperature environment where an oil film is difficult to form as in the turbocharger of an automobile, the aforementioned fatigue wear is liable to occur.

Accordingly, the present inventors operated the rolling bearings shown in Table 3 up to the calculated life (538 hours), observed the states of the surfaces of the races by an optical microscope and an electron microscope after the test, and evaluated the fatigue wear depending on whether or not fine cracks have occurred on the surface.

The test conditions for evaluating the fatigue wear were as follows, and Table 7 shows the test results.

Test Conditions for Evaluating Fatigue Wear

Test machine: Ball bearing life testing machine (made by NSK Ltd.)
Test bearings: 7205C type (angular ball bearing)
Test load: 150 kgf (axial load)
No. of revolutions: 25,000 rpm
Calculated life: 538 hours
Test temperature: 200° C.
Lubrication type: oil bath
Lubricating oil: MIL-L-23699C lubricating oil (made by Mobil)
Foreign matters: steel powder
Vickers hardness Hv: 870
Grain size: 37 μm or less
Concentration: 300 ppm

TABLE 7

| | Bearing No. | Surface of Race |
|---|---|---|
| Examples | 1 | No particular fine cracks were observed. |
| | 2 | " |
| | 3 | " |
| | 4 | " |
| | 5 | " |
| | 6 | " |
| | 7 | " |
| | 8 | " |
| | 9 | " |
| Conventional Examples | 10 | Numerous fine cracks occurred on the surface, and flaking was observed. |
| | 11 | No particular fine cracks were observed. |
| Comparative Examples | 12 | Numerous fine cracks occurred on the surface, and flaking was observed. |
| | 13 | No particular fine cracks were observed. |
| | 14 | Numerous fine cracks occurred on the surface, and flaking was observed. |
| | 15 | Fine cracks occurred. |
| | 16 | " |
| | 17 | " |
| | 18 | " |
| | 19 | Numerous fine cracks occurred on the surface, and flaking was observed. |
| | 20 | Fine cracks occurred. |
| | 21 | " |

As is apparent from Table 7, the occurrence of fine cracks was observed in Conventional Example 10, Comparative Examples 12, 14 to 21. In addition, as is apparent from a comparison between Conventional Example 11 and Comparative Example 12, it can be appreciated that in a case where a ceramic material excelling in wear resistance such as $Si_3N_4$ is used as the material of the rolling element, the peeling damage (fatigue wear) is liable to occur as compared with the case where a steel material is used as the material of the rolling element. Conceivably, this is attributable to the fact that since the peeling damage is an aggregate of very small flakings in which very small impressions due to biting by very small foreign matters constitute the starting points of flaking, such impressions that a stress concentration in the impressions becomes preferentially large occur in the race, with the result that the aforementioned peeling damage is liable to occur.

Therefore, in the case where a ceramic material excelling in wear resistance such as $Si_3N_4$ is used as the material of the rolling element, the occurrence of the peeling damage can be suppressed by using a material of the race which is capable of preventing the occurrence of the flaking of the impression starting-point type in the same way as the evaluation of flaking life (see FIGS. 5 to 9), in order to prevent the fatigue wear (peeling damage).

(5) Evaluation of Dimensional Stability

In cases where the rolling bearing is used under a high-temperature environment of 300° C. at maximum as in the turbocharger of an automobile, a change in the dimension of the bearing with a lapse of time is liable to occur, and a fault due to an abnormality of the bearing can possibly occur.

Accordingly, the present inventors heated and maintained the rolling bearings shown in Table 3 at 200° C., measured the outside dimension of the race after 1000 hours, and evaluated the dimensional stability.

Incidentally, the tempering temperature which affects the dimensional stability was set to 320° C. with the exception of Example 10 for which the high-carbon chromium bearing steel (SUJ2) was used and Conventional Example 11 and Comparative Example 12 for which the heat resisting steel (M50) was used. Meanwhile, with respect to Conventional Example 10 the tempering temperature was set to 240° C. by taking the decrease in hardness into consideration, and with respect to Conventional Example 11 and Comparative Example 12 the tempering temperature was set to 550° C. to allow precipitation hardening.

Table 8 shows the dimensional stability with respect to the test bearings.

TABLE 8

|  | Bearing No. | Rate of Dimensional Change (x $10^{-2}$%) |
|---|---|---|
| Examples | 1 | 1.4 (expansion) |
|  | 2 | 1.7 (expansion) |
|  | 3 | 1.6 (expansion) |
|  | 4 | 0.4 (expansion) |
|  | 5 | 0.8 (expansion) |
|  | 6 | 0.6 (expansion) |
|  | 7 | 0.6 (expansion) |
|  | 8 | 0.3 (expansion) |
|  | 9 | 0.5 (expansion) |
| Conventional Examples | 10 | 1.8 (shrinkage) |
|  | 11 | 0.1 (expansion) |
| Comparative Examples | 12 | 0.1 (expansion) |
|  | 13 | 0.4 (expansion) |
|  | 14 | 1.1 (expansion) |
|  | 15 | 0.6 (expansion) |
|  | 16 | 0.6 (expansion) |
|  | 17 | 0.4 (expansion) |
|  | 18 | 0.4 (expansion) |
|  | 19 | 0.2 (expansion) |
|  | 20 | 0.6 (expansion) |
|  | 21 | 0.4 (expansion) |

As for Examples 1 to 3, Conventional Example 10, and Comparative Example 14, the carbon concentrations in the steel were set to at least 0.67 wt. %, so that a large amount of residual austenite existed even if tempering was effected at high temperature. For this reason, it can be seen that in Examples 1 to 3, Conventional Example 10, and Comparative Example 14, the residual austenite in the steel decomposed, with the result that the bearings expanded by $1.0_x 10^{-2}$(%) or more in terms of the rate of dimensional change, and the change in the dimensions of the bearings with a lapse of time was large, whereas the bearings whose carbon concentration was set in the range of 0.3 to 0.6 wt. % exhibited favorable dimensional stability.

Thus, it can be appreciated that the dimensional stability of the dimensions of the bearings have a close relationship with the carbon concentration in the steel of the material of the race, and that the carbon concentration in the steel is preferably in the range of 0.3 to 0.6 wt. %.

Table 9 sums up the above-described various tests for evaluating the bearings.

TABLE 9

|  | Bearing No. | Strip Wear | Flaking Life | Spin Wear | Fatigue Wear | Dimensional Stability |
|---|---|---|---|---|---|---|
| Examples | 1 | A | A | A | A | B |
|  | 2 | A | A | A | A | B |
|  | 3 | A | A | A | A | B |
|  | 4 | A | A | A | A | A |
|  | 5 | A | A | A | A | A |
|  | 6 | A | A | A | A | A |
|  | 7 | A | A | A | A | A |
|  | 8 | A | A | A | A | A |
|  | 9 | A | A | A | A | A |
| Conventional Example | 10 | — | C | C | C | B |
|  | 11 | C | A | A | A | A |
| Comparative Example | 12 | A | C | A | C | A |
|  | 13 | C | A | A | A | A |
|  | 14 | A | C | C | C | B |
|  | 15 | A | C | A | C | A |
|  | 16 | A | C | A | C | A |
|  | 17 | A | C | A | C | A |
|  | 18 | A | C | C | C | A |
|  | 19 | A | C | A | C | A |
|  | 20 | A | C | A | C | A |
|  | 21 | A | C | C | C | A |

In the table, the mark "A" indicates good; "B" slightly inferior; and "C" bad.

As is apparent from Table 9, as for Conventional Example 10, since Mo was not included in the material of the race, and the Si content was outside the range of the present invention, the results of evaluation of the flaking life and the fatigue wear were "bad," and the result of evaluation of spin wear was also "bad." since carbonitriding treatment was not provided. As for Conventional Example 11, since the heat resisting steel (M50) was used as the material of the rolling element, the result of evaluation of strip wear was "bad."

As for Comparative Example 12, since the contents of Cr and Mo were excessively large while the Si content was small, excessively large carbides precipitated on the surface, with the result that the results of evaluation of the flaking life and the fatigue wear were "bad." As for Comparative Example 13, since the heat resisting steel (M50) was used as the material of the rolling element, the result of evaluation of strip wear was "bad." As for Comparative Example 14, since the Si content was small and carbonitriding treatment was not provided, the results of evaluation of flaking life, spin wear, and fatigue wear were "bad." As for Comparative Examples 15 to 17, since Si, Cr, and Mo were respectively insufficient, the results of evaluation of flaking life and fatigue wear were "bad." As for Comparative Example 18, since the material of the race was not subjected to carbonitriding treatment, it was impossible to improve wear resistance due to the solid solution of nitrogen, with the result that the results of evaluation of flaking life, spin wear, and fatigue wear were "bad."

As for Comparative Example 19, since the surface carbon concentration in the material of the race was insufficient, the results of evaluation of flaking life and fatigue wear were "bad." As for Comparative Example 20, since the surface carbon concentration was excessive, a flaw occurred in the structure due to the falling off of excessively large carbides, and the results of evaluation of flaking life and fatigue wear were therefore "bad." As for Comparative Example 21, since the surface nitrogen concentration in the material of the race was low, and the solid solution of nitrogen into the structure was insufficient, the results of evaluation of flaking life, spin wear, and fatigue wear were "bad."

In contrast, all the Examples 1 to 9 were within the range of the present invention, and the results of evaluation of the strip wear, the flaking life, the spin wear, and the fatigue wear were "good." Particularly in Examples 4 to 9, since the carbon concentration in the steel was controlled in the range of 0.3 to 0.6 wt. %, the amount of the residual austenite in the core portion of the steel was small, and excellent results were obtained in the dimensional stability as compared with Examples 1 to 3.

As described above, the rolling bearing in accordance with the present invention comprises: races including an inner race and an outer race formed of an alloy steel material; and a plurality of rolling elements formed of a ceramic material and interposed between the inner race and the outer race in such a manner as to be capable of rolling, wherein at least one of the inner race and the outer race is formed of an alloy steel containing 0.7–1.5 wt. % Si, 0.5–2.0 wt. % Cr, and 0.5–2.0 wt. % Mo in a steel, and the surface of the alloy steel material is subjected to carbonitriding treatment. Accordingly, the heat resistance of the rolling bearing is not impaired, and the rolling bearing excels in various wear characteristics including the strip wear, spin wear, and fatigue wear, and it is possible to prevent the early flaking of the impression starting-point type. Therefore, it is possible to obtain a rolling bearing which excels in the durability and heat resistance even if it is used in a high-temperature high-speed environment, and which does not cause a noise fault.

While the invention has been described in detail and with reference to specific embodiments thereof, it will be apparent to one skilled in the art that various changes and modifications can be made therein without departing from the spirit and scope thereof.

What is claimed is:

1. A rolling bearing comprising:

races including an inner race and an outer race formed of an alloy steel material; and a plurality of rolling elements formed of a ceramic material and interposed between said inner race and said outer race such that the rolling elements rotate freely, wherein said inner race is formed of an alloy steel consisting essentially of 0.7–1.5 wt. % Si, 0.5–2.0 wt. % Cr, and 0.5–2.0 wt. % Mo in a steel, and is subjected to carbonitriding treatment such that a surface carbon concentration at the surface of a raceway track of said inner race is 0.8 wt. %–1.1 wt. %, and a surface nitrogen concentration thereof is 0.2–0.6 wt. %, said rolling bearing being one to be used for a turbocharger, the maximum diameter of a carbide present in the surface of the raceway of 4 $\mu$m or less, and the average amount of residual austenite present in the surface and the core of the bearing is 5 vol. % or less.

* * * * *